(No Model.)  2 Sheets—Sheet 1.

J. B. FELLOWS.
POTATO DIGGER.

No. 420,573.  Patented Feb. 4, 1890.

Witnesses:
L. W. Hubbard
E. J. Peabody

Inventor:
Jerome B. Fellows
per C. A. Shaw & Co.,
Attys.

(No Model.) 2 Sheets—Sheet 2.

J. B. FELLOWS.
POTATO DIGGER.

No. 420,573. Patented Feb. 4, 1890.

WITNESSES:
J. F. Hubbard
E. J. Peabody

INVENTOR:
Jerome B. Fellows
PER C. A. Shaw & Co.
ATTYS.

UNITED STATES PATENT OFFICE.

JEROME B. FELLOWS, OF FRYEBURG, MAINE.

POTATO-DIGGER.

SPECIFICATION forming part of Letters Patent No. 420,573, dated February 4, 1890.

Application filed May 14, 1888. Renewed July 10, 1889. Serial No. 317,057. (No model.)

*To all whom it may concern:*

Be it known that I, JEROME B. FELLOWS, of Fryeburg, in the county of Oxford, State of Maine, have invented a certain new and useful Improvement in Potato-Diggers, of which the following is a description sufficiently full, clear, and exact to enable any person skilled in the art or science to which said invention appertains to make and use the same, reference being had to the accompanying drawings, forming part of this specification, in which—

Figure 1:
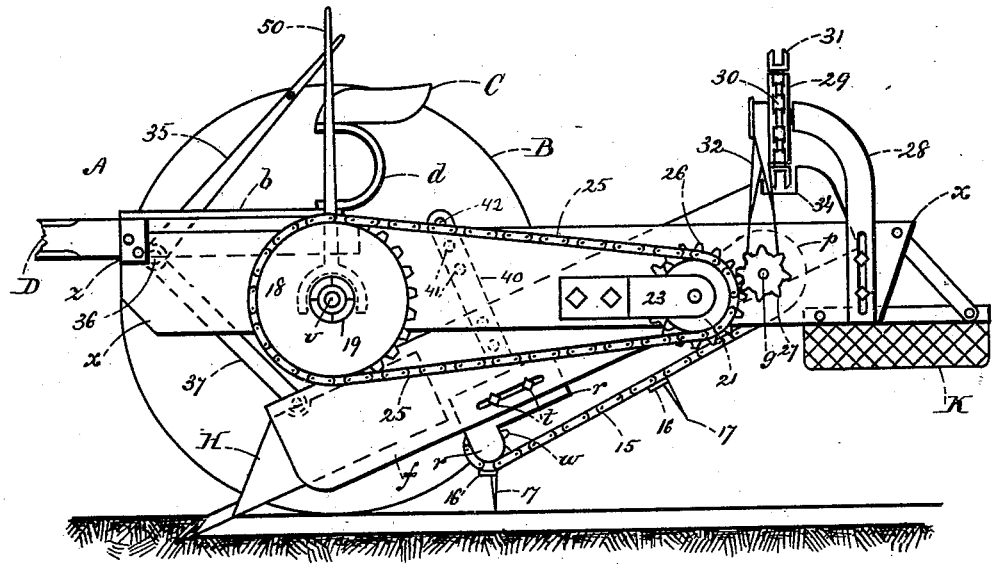
Figure 2:
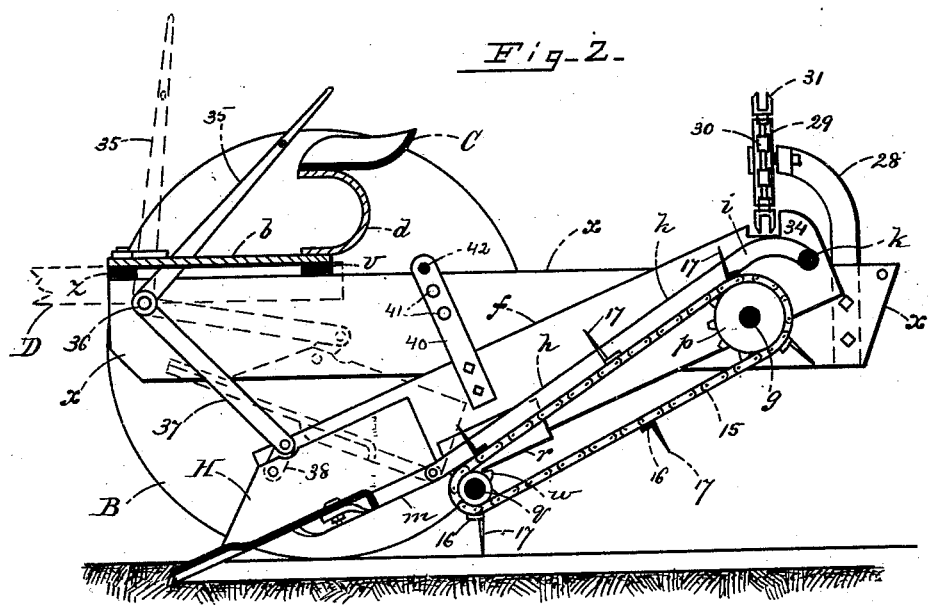
Figure 3:
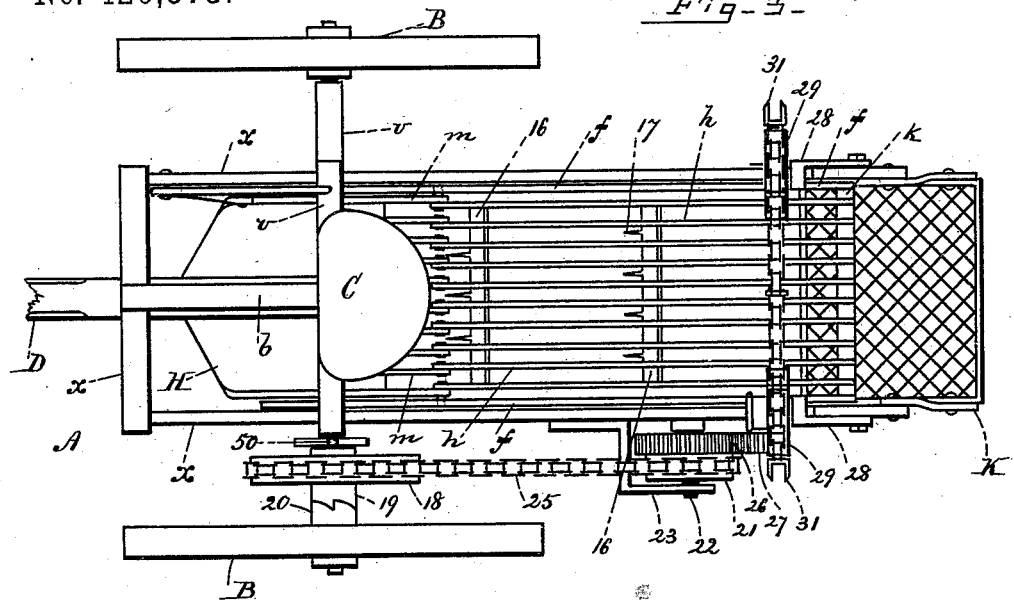
Figure 4:
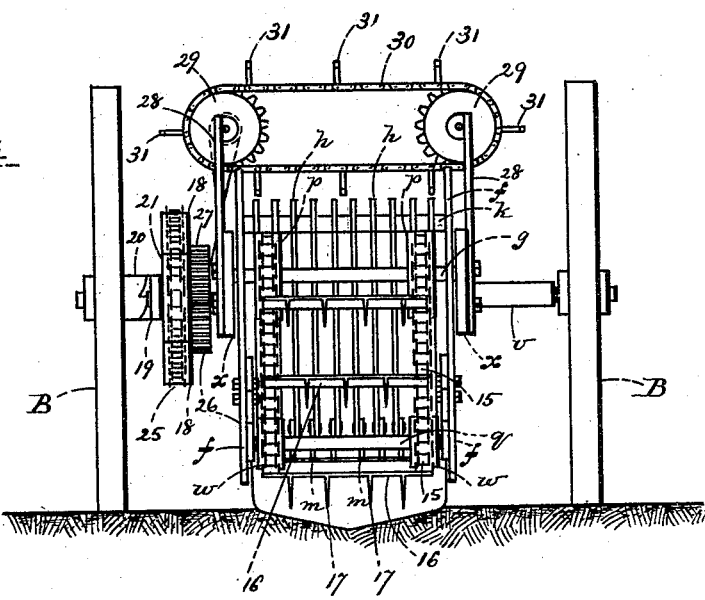

Figure 1 is a side elevation of my improved potato-digger, represented as in position for use, one of the wheels being removed; Fig. 2, a central vertical longitudinal section of the same; Fig. 3, a top plan view, and Fig. 4 a rear elevation.

Like letters and figures of reference indicate corresponding parts in the different figures of the drawings.

My invention relates to that class of potato-diggers which are provided with means for separating them from the soil and tops; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body or frame-work of the digger, which consists, primarily, of two broad parallel longitudinally-arranged side bars $x\,x$, secured together at their forward ends by a cross-bar $z$. The bars $x$ are fastened near their forward ends to an upwardly-curved axle $v$, upon which the wheels B are disposed in the usual manner. The cross-bar $z$ and the upper portion of the axle $v$ are connected by a brace $b$, a seat C for the driver being secured by a spring-support $d$ centrally to said axle, and the pole D fastened to said cross-bar and axle in the usual position. A shaft $g$ passes transversely through the side bars $x$ near their rear ends, and pivoted together by their rear end portions on said shaft between said bars are two supplemental side bars $f$. Secured to each side bar $f$ is a vertically-arranged arm 40, provided with holes 41, adapted to receive a diagonally-arranged bar 42, the ends of which rest upon the side bars $x\,x$ and sustain said bars $f$ in position. A series of parallel rods $h$, curved at $i$, as shown in Fig. 2, are secured by one end to a transverse brace $k$, connecting the rear ends of the side bars $f$. A scoop or shovel H, for digging or unearthing the potatoes, is pivoted by means of short parallel rods $m$ to the forward end of each rod $h$, respectively, and to the side bars $f$. (See Fig. 3.)

Disposed on each end of the shaft $g$, between the side bars $f$, is a sprocket-wheel $p$, (see Fig. 2,) and attached to a shaft $q$, journaled in brackets $r$, adjustably secured to the side bars $f$, opposite the front end of the rods $h$ by screw-bolts $t$, as shown in Fig. 1, are corresponding sprocket-wheels $w$. Chain belts 15 are disposed on corresponding sprocket-wheels $p\,w$ on the shafts $g\,q$, the brackets $r$ being made adjustable for the purpose of changing the position of the shaft $q$ and tightening said belt when necessary. The belts 15 are connected at intervals by transversely-arranged slats or braces 16, which are provided with fingers or prongs 17, adapted to project upward between the rods $h$ as said chains travel on said sprocket-wheels.

The purpose of the fingers 17 is to carry the potatoes up the incline formed by the rods $h$ and over the curved portion $i$ thereof after they are dug by the shovel H.

A large sprocket-wheel 18 is journaled on the axle $v$ outside the side bar $x$, the hub of said wheel being provided with a clutch 19, adapted to engage a similar clutch 20, formed on the hub of the adjacent wheel B.

An upwardly-projecting lever 50, within easy reach of the driver, is pivoted by its lower end to the axle $v$ and connects with the hub of the sprocket-wheel 18, by means of which the clutches 19 and 20 may be thrown in and out of engagement, as desired.

A sprocket-wheel 21 (see Figs. 1 and 3) is secured on a stub-shaft 22, journaled in a side bar $x$ and in a bracket 23, attached to said side bar, a chain belt 25 connecting said sprocket with the sprocket 18 on the axle $v$. Secured to the hub of the sprocket 21 is a gear 26, which intermeshes with a gear 27, secured to the corresponding end of the shaft $g$.

Vertically-adjustable curved standards 28 are respectively secured to the rear end of each side bar $x$, and journaled, respectively, to the upper end of each of said standards is a sprocket-wheel 29. These sprocket-wheels are connected by a chain belt 30, provided at intervals with outwardly-projecting teeth 31, said sprocket-wheels being driven by a twisted belt 32, connecting one of them with the hub of the gear 27. (See Fig. 1.)

The sprocket-wheels 29 are so disposed that when in motion their belt 30 will travel transversely across the curved portion $i$ of the rods $h$, slots 34 being formed in the side bars $f$ to allow the teeth 31 on said belt to pass near the curved portion of said bars.

A lever 35 (see Figs. 1 and 2) is pivoted at 36 to the forward end of a side bar $x$, where it can be easily operated by a person occupying the seat C, said lever having a downwardly-projecting arm 37, the lower end of which is pivoted to a short bar 38, pivoted to the shovel H. The purpose of said lever is to raise the shovel H out of contact with the ground, as shown by dotted lines in Fig. 2, and also to secure it at any angle desired when in use.

Attached to the rear end of the side bars $x$ is a wire basket or holder K for receiving the potatoes as they fall over the curved portion $i$ of the rods $h$, as hereinafter described. Said basket may be constructed in the form of a wire chute, if desired, for depositing the potatoes in a row on the ground.

In the use of my improvement the shovel or scoop H is adjusted by the driver, by means of the lever 35, at the angle it is desired to have it enter the ground, as shown in Figs. 1 and 2, and as the vehicle advances the potatoes, with their tops and a portion of the earth, will be taken up by the shovel H and deposited on the parallel rods $h$. The clutches 19 and 20 being held in gear by the lever 50, the wheels B as they revolve set in motion the sprocket-wheel 18, which, by means of the belt 25, communicates motion to the sprocket 21 and gears 26 and 27, thereby revolving the shaft $g$. As the shaft $g$ rotates, it causes the chain belts 15 to travel, and the prongs or fingers 17 on the bars 16, protruding upward between the parallel rods $h$, to engage the potatoes and stalks and carry them rearward over the curved portion $i$ of said bars into the wire basket K. The greater portion of the soil or dirt which adheres to the potatoes is sifted through the spaces between the rods $h$ during their passage over said rods, and the potato-tops, when they reach the upper part of the curved portion $i$ of said rods, are caught by the teeth 31 on the chain belt 30, said belt being disposed on the sprockets 29 and actuated by the crossed belt 32 as the shaft $g$ revolves, in a manner that will be readily understood by all conversant with such matters without a more explicit description. The tops as thus caught by the teeth 31 are thrown to one side of the apparatus, and thus prevented from being carried with the potatoes into the basket K.

I deem it preferable to have the fingers 17 on alternate bars or braces 16 pass through alternate spaces between the rods $h$, as shown in Fig. 3, but do not confine myself to that method of construction.

Having thus explained my invention, what I claim is—

1. In a potato-digger, the combination of a frame secured to an axle, supporting-wheels on said axle, side bars secured to a shaft in said frame, parallel rods having curved rear ends secured to a rod in said bars, an adjustable shovel or scoop pivoted to the front ends of said rods and side bars, vertically-adjustable standards secured to the rear end of said frame, sprocket-wheels journaled on said standards and carrying a chain belt provided with outwardly-projecting teeth, a gear on said shaft connected with one of said sprockets by a belt, and chains connecting said gear and one of said supporting-wheels for actuating said sprockets, substantially as and for the purposes set forth.

2. In a potato-digger, the combination of an axle carrying supporting-wheels, a framework, a shovel, a screen for receiving the potatoes and earth from the shovel, endless chain belts carrying bars provided with prongs or fingers projecting through the screen and adapted to engage the potatoes and push them to the rear of the machine, a basket for receiving the potatoes from the screen, an endless chain belt adapted to run transversely over the rear end of the screen and provided with prongs or fingers for removing the potato-tops from the screen, means for elevating the shovel, and adjunctive connecting and operative mechanism, substantially as described.

JEROME B. FELLOWS.

Witnesses:
SETH W. FIFE,
FRED R. FIFE.